(12) United States Patent
Monereau

(10) Patent No.: US 6,311,518 B1
(45) Date of Patent: Nov. 6, 2001

(54) APPARATUS FOR COUNTERCURRENT HEAT EXCHANGE AND ITS APPLICATION TO INSTALLATIONS FOR THE DISTILLATION OF AIR

(75) Inventor: Christian Monereau, Paris (FR)

(73) Assignee: L'Air Liquide, Societe Anonyme pour l'Etude et l'Exploitation des Prcedes Georges Claude, Paris Cedex (FR)

(*) Notice: Subject to any disclaimer, the term of this patent is extended or adjusted under 35 U.S.C. 154(b) by 0 days.

(21) Appl. No.: 09/564,866

(22) Filed: May 4, 2000

(30) Foreign Application Priority Data

May 4, 1999 (FR) .................................................. 99 05646

(51) Int. Cl.[7] ........................................................... F25J 3/00
(52) U.S. Cl. ............................... 62/644; 62/641; 62/908; 62/909
(58) Field of Search .............................. 62/643, 644, 499, 62/904, 908, 909, 910, 641

(56) References Cited

U.S. PATENT DOCUMENTS

| 2,272,108 | 2/1942 | Bradley . | |
|---|---|---|---|
| 2,521,369 | * 9/1950 | Holm et al. | 62/904 |
| 2,586,207 | * 2/1952 | Collins | 62/904 |
| 2,724,954 | * 11/1955 | Maetz | 62/904 |
| 2,735,278 | 2/1956 | Rice . | |
| 2,964,914 | * 12/1960 | Schuftan et al. | 62/909 |
| 3,304,999 | * 2/1967 | Ward | 62/909 |
| 5,987,894 | * 11/1999 | Claudet | 62/499 |

FOREIGN PATENT DOCUMENTS

| 41 08 744 | 8/1992 | (DE) . |
| 0 438 282 | 7/1991 | (EP) . |
| 1.246.856 | 2/1961 | (FR) . |
| WO 96/23188 | 8/1996 | (WO) . |

* cited by examiner

Primary Examiner—Ronald Capossela
(74) Attorney, Agent, or Firm—Young & Thompson

(57) ABSTRACT

This apparatus (3A, 3B) is for heat exchange between at least one first fluid available at a temperature at about ambient and at least one second fluid available at a cryogenic temperature below −20° C. It comprises structure alternately to circulate the first fluid through heat exchange material in an overall centripetal manner relative to a general central axis (X-X) of the apparatus (3), from a radially external inlet (17) of the apparatus, and structure to circulate the second fluid through the heat exchange material in an overall centrifugal manner relative to said central axis, from a radially internal inlet (18) of the apparatus. Use in cooling regenerators and exchangers, and if desired for simultaneous purification, of atmospheric air to be distilled.

20 Claims, 1 Drawing Sheet

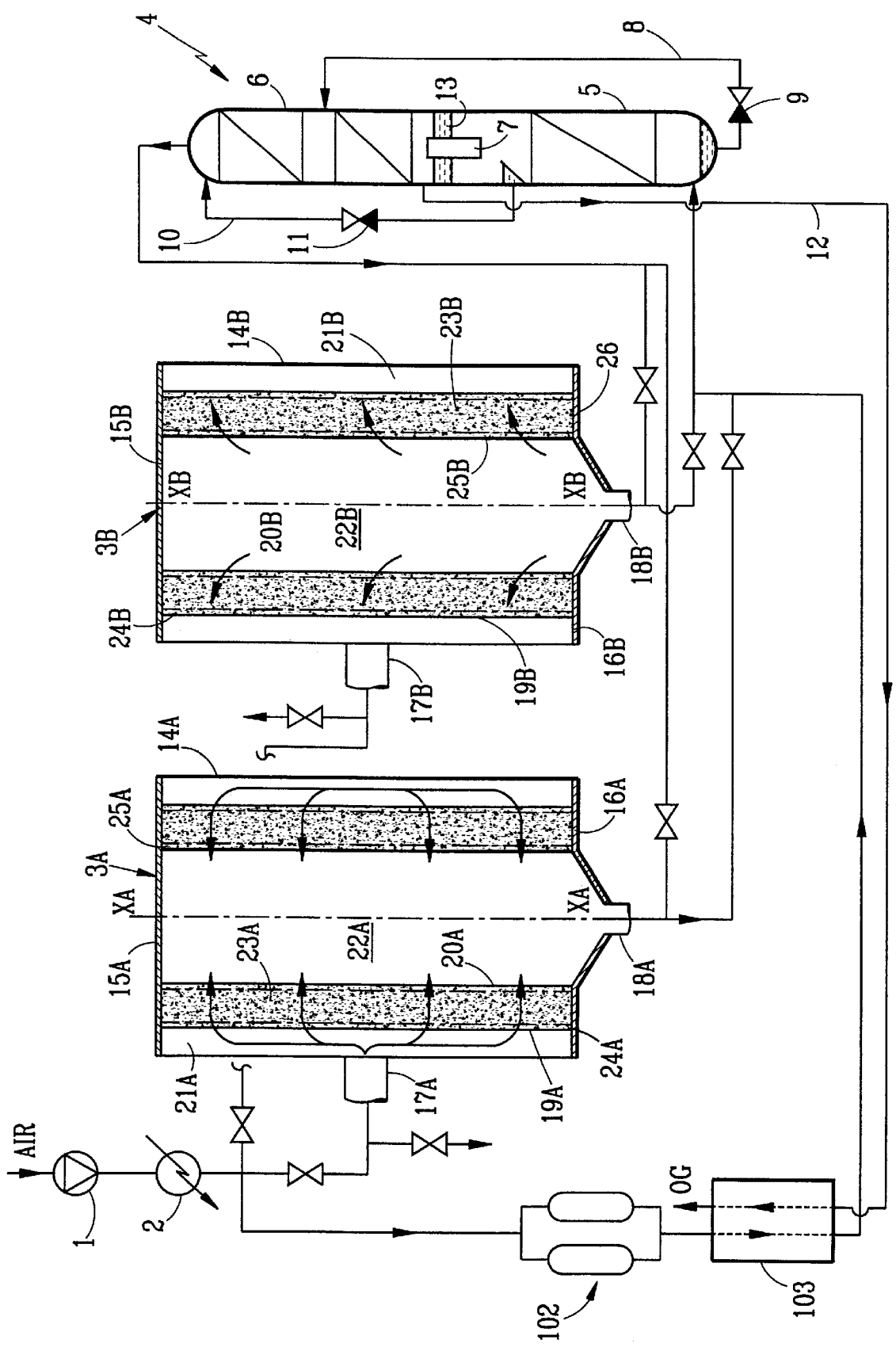

APPARATUS FOR COUNTERCURRENT HEAT EXCHANGE AND ITS APPLICATION TO INSTALLATIONS FOR THE DISTILLATION OF AIR

The present invention relates to apparatus for a countercurrent heat exchange, between at least one first fluid available at a temperature near ambient and at least one second fluid available at a cryogenic temperature below −20° C.

The invention is applicable particularly to the cooling of atmospheric air to be distilled, and more generally to liquefaction, separation, purification or cold generation units, in which there is maintained a temperature level substantially below atmospheric temperature, for example below −20° C.

In what follows, reference will be had to the separation of air gases by distillation.

A conventional method to separate air gases consists in compressing atmospheric air, purifying it from water and $CO_2$ and cooling it, then introducing it into a distillation apparatus in which it is separated into at least one fluid rich in nitrogen and at least one fluid rich in oxygen. At least a portion of these effluents is reheated to ambient temperature, the available cold being used to lower the temperature of the air. The frigorific power necessary is generally supplied by an expansion turbine handling a fraction of the air. Numerous modifications of this process are described in the literature.

Purification and cooling means for air are of three types:

(1) Regenerator-purifiers, which contain a packing, arranged or in bulk, for heat exchange. They can be used pair-wise or group-wise, by rotation. The description which is given below corresponds to pair-wise operation to facilitate explanation.

In a half-period, a given regenerator is cooled by circulation in a first direction of a residual gaseous flow from the distillation apparatus. In the following half-period, the same regenerator is traversed in the other direction by the air to be cooled, from which it traps the water and $CO_2$ by solidification.

(2) Reversible exchangers, of which each passage is alternately traversed by a cold gaseous flow and by air to be cooled. The reversals permit, as in the preceding case, evacuating by elution the solid impurities which are deposited in the passages traversed by the air.

Reversible exchangers can moreover enclose one or more complementary heat exchange bundles permitting in particular reheating a pure fluid.

(3) Purification at the outset: the compressed air is purified adjacent ambient temperature by selective adsorption of the water and $CO_2$, then the purified air is cooled, either in a regenerator, or in a simple heat exchanger.

Regenerator-purifiers and purely thermal regenerators can moreover enclose one or more complementary heat exchange bundles permitting reheating a pure fluid.

In all cases, there is utilized at least one heat exchange apparatus, generally countercurrent, whose external surface has a great area and has a temperature variable between the inlet temperature of the warm fluid, which is air, and a very low temperature, of the order of −180 to −200° C.

So as to limit the parasitic heat exchanges which degrade the performance of the installation, these heat exchange apparatuses are generally insulated from the ambient by a cold box, which is a metallic enclosure provided with an insulation in a nitrogen atmosphere to prevent the entry of moisture.

Despite the presence of this cold box, which represents a substantial investment, the residual heat exchanges, via the insulation, between the warm portions and the cold portion of the heat exchange apparatus and between the cold portions and the environment, remain substantial. Thus, the thermal losses of the heat exchange line to the environment often represent 20 to 25% of all the thermal losses of the installation.

The invention has for its object to reduce the parasitic heat exchanges of countercurrent heat exchange apparatus.

To this end, the invention has for its object a countercurrent heat exchange apparatus, between at least one first fluid at a temperature adjacent ambient and at least one second fluid at a cryogenic temperature below 20° C., characterized in that it comprises means to circulate the first fluid in an overall centripetal manner relative to a general central axis of the apparatus, from an inlet radially outside the apparatus, and means to cause the second fluid to circulate in an overall centrifugal manner relative to said central axis, from an inlet radially inside the apparatus.

The invention also has for its object an installation for the distillation of air, of the type comprising air compression means, means to cool and purify the air, and an air distillation apparatus supplied with cooled and purified air, characterized in that the cooling and purifying means comprise at least one heat exchange apparatus as defined above, whose radially external inlet is for the inlet of air to be distilled and whose radially internal inlet is for the inlet of a fluid from the air distillation apparatus.

The invention also has for its object a process for cryogenic cooling of a first fluid available at about ambient temperature by countercurrent heat exchange with a second fluid available at a cryogenic temperature below −20° C., characterized in that the first fluid is circulated in a heat exchange apparatus in an overall centripetal manner relative to a general central axis of this apparatus, from a first radially external inlet of the apparatus, and the second fluid is circulated in an overall centrifugal manner relative to said central axis, from a radially internal inlet of the apparatus.

An example of embodiment of the invention will now be described with respect to the accompanying drawing, whose single figure represents schematically an installation for the distillation of air according to the invention.

The installation shown in the drawing is adapted to produce gaseous oxygen from atmospheric air by distillation. It comprises essentially an air compressor 1 provided at its outlet with an air or water cooler 2, two identical regenerators 3A, 3B mounted in parallel, a device 102 for purifying air by adsorption, a heat exchanger 103, and a double distillation column 4.

The double column 4 is constituted in a conventional manner by a medium pressure distillation column 5 surmounted by a low pressure distillation column 6, with an evaporator-condenser 7 which permits condensing the head vapor (fairly pure nitrogen) of the column 5 by evaporation of the bottoms liquid (nearly pure oxygen) of the column 6. There is shown the conduit 8 for lifting "rich liquid" (air enriched in oxygen) from the bottom of the column 5 to an intermediate level of the column 6, this conduit being provided with an expansion valve 9, and also the conduit 10 for raising "poor liquid" (nearly pure nitrogen) from the head of the column to that of column 6, this conduit being provided with an expansion valve 11. The gaseous oxygen product is conveyed via a withdrawal conduit 12 connected to the bottom of the column 6, just above the liquid oxygen bath 13.

There will now be described the structure of the regenerators 3A and 3B, the references used being without suffix but being understood as belonging to each regenerator of the suffix A or B respectively.

Each regenerator 3 comprises a cylindrical sleeve 14 with a vertical axis X-X, provided with an upper end 15 and a lower end 16. A conduit 17 empties at about mid-height in the sleeve 14, whilst a conduit 18 opens through the central region of the end 16.

Two cylindrical grills, namely an external grill 19 and an internal grill 20, extend from end 15 to the end 16, to which they are affixed rigidly. The grill 19 delimits with the sleeve 14 an annular external space 21, whilst the grill 20 surrounds a cylindrical central space 22. Between these two grills is delimited another annular space, which is filled with an annular bed 23 of gravel.

There is also indicated schematically on the drawing an assembly of conduits and valves which permit effecting selectively one or the other of the two following connections:

(l1) Connection of the outlet of cooler 2 to a conduit 17A, from the conduit 18A to the bottom of the column 5, from the top of column 6 to the conduit 18B, and from the conduit 17B to the atmosphere;

(l2) Connection of the outlet of cooler 2 to the conduit 17B, from the conduit 18B to the bottom of the column 5, from the top of column 6 to the conduit 18A, and from the conduit 17A to the atmosphere.

In the drawing, the connection (l1) is shown on the drawing in full line.

The installation operates in the following manner.

The connection (l1) being established by suitable manipulation of the valves, the residual gas from the head of the column 6, constituted by impure nitrogen, enters the central space 22B of the regenerator 3B via the conduit 18B. This gas passes through the assembly radially, in the centrifugal direction, the bed 23B, cooling this latter. It then enters the external space 21B, leaves the regenerator via the conduit 17B, and is vented to the atmosphere.

Simultaneously, a portion of the entering air, compressed in 21 and brought in 2 to the vicinity of ambient temperature, penetrates the annular space 21A, traverses the assembly radially, in the centripetal direction, the bed 23A, which has first been cooled as described above, and cools itself to the vicinity of its dew point, then it enters the central space 22A. It then leaves the regenerator 3A via the conduit 18A and is sent to the bottom of the column 5.

In the course of this cooling, the solidification of the water and the $CO_2$ contained in the air stops these elements by the bed 23A, and hence carries out the simultaneous purification of the air.

The rest of the compressed air is precooled in 2, is purified in the adsorption device 102, then cooled in the indirect heat exchanger 103 in countercurrent to the oxygen conveyed in the conduit 12, before being introduced into the bottom of the column 5.

This operating phase continues until, on the one hand, there remains in the bed 23B a thin external annular layer 24B of predetermined thickness, adjacent ambient temperature T1, and, on the other hand, there is in bed 23A a thin internal annular layer 25A of predetermined thickness adjacent the cold temperature T2 of the residual gas. This phase lasts generally 1 to 15 minutes.

We now pass from the connection (l1) to the connection (l2). Air thus cools by passing in the centripetal direction of the bed 23B, before being sent to the column 5, whilst the impure nitrogen cools the bed 23A by centrifugal separation whilst eliminating by elution the water and $CO_2$ previously trapped by the latter.

Again, this operating phase is stopped when there remain two thin annular layers, an external 24A and an internal layer 25B, in the two beds, respectively adjacent ambient temperature and the cold temperature T2.

Thus, in the course of cooling each bed by impure nitrogen, the cold front never leaves this bed and, in the course of its reheating with air, the same is true for the warm front. Correspondingly, the external spaces 21A and 21B permanently remain adjacent ambient temperature, and the internal spaces 22A and 22B permanently remain in the vicinity of the cold temperature T2.

Thanks to this arrangement, the parasitic heat exchanges, from one region to another of a regenerator or between the latter and the environmental atmosphere, are minimal, and it is not necessary to insulate thermally the sleeves 14A and 14B, which constitute in practice essentially the external surface of the regenerators. As shown, it suffices to provide thermal insulation 26 on the two ends of each regenerator, namely only on the radially internal region of these ends.

Known technologies for the production of apparatus (adsorbers or reactors) with an annular bed, as to the distribution of the two fluids, to the construction and to the securement of the grills, can be used here. Of course there should be accounting for the pressures of the two fluids (5 to 6 bars absolute for air, 1.1 to 1.2 bars absolute for impure nitrogen for example in the most conventional arrangements), their temperature levels, and the absence of fluctuation of temperatures of the two grills.

Similarly, the valves of the cold portion will preferably be replaced, in a conventional way, by the valve boxes which operate only under the influence of the pressures of the two fluids.

It is to be noted that the annular beds 23 offer to the fluids a very large cross-section for passage, which permits using beds of small thickness. The resulting low pressure drop is useful to reduce the pressure to which the entering air is compressed, and hence the consumed energy, and/or to utilize more effective beds.

In particular, instead of pellets of an average diameter of 15 mm generally used in vertical flow regenerators, there can be used smaller gravel, of an average diameter comprised between 1 and 10 mm, for example about 5 mm. With such smaller pellets, of equal volume, the gas/particle exchange surface is increased by a factor of 3; for identical flow velocities, the heat exchange coefficient increases by a factor of the order of 2. The dimensions of the regenerators can therefore be reduced.

As a modification, the pellets which constitute the annular beds can be replaced by other types of bulk particles, or else by arranged packing.

In another embodiment, the regenerators can be used only as thermal regenerators, in which case they are preceded by a separate purification apparatus, particularly by adsorption, also as a modification, each regenerator can comprise purification means separate from the cooling means, in the form of a second annular bed of particles adsorbing water and $CO2_2$, this second bed surrounding the bed 23.

These purification means can either stop all of the water and $CO_2$, or only partially the water vapor, to avoid any condensation in the form of liquid before trapping in the form of solid (ice). The purification means can be effective also to ensure stopping other secondary pollutants of the air.

Other heat exchange arrangements, countercurrent, reversible or not, with overall centripetal circulation of a first fluid and overall centripetal circulation of a second fluid, can be envisaged, for example from a spiral winding of a stack of thin metal sheets separated by corrugated spacers. Each pair of sheets defines a passage of small thickness, and the closure bars hermetically seal each passage about its periphery leaving free inlet and outlet openings for the fluid or fluids which circulate therethrough.

Another embodiment of exchanger of this type consists in a stack of discs operating in parallel between two central collectors at cryogenic temperature and two peripheral collectors near ambient temperature, each disc consisting of a double tube spirally wound on itself.

What is claimed is:

1. Apparatus for countercurrent heat exchange between at least one first fluid at a temperature adjacent ambient temperature and at least one second fluid at a cryogenic temperature below $-20°$ C., which comprises a vessel containing heat exchange material and having a radially external passageway and a radially internal passageway, means alternately to circulate the first fluid in an overall centripetal manner relative to a general central axis (X-X) of the apparatus (3), from said radially external passageway (17) of the apparatus through said heat exchange material and out said radially internal passageway, and means to circulate the second fluid in an overall centrifugal manner relative to said central axis, from said radially internal passageway (18) through said heat exchange material and out said radially external passageway of the apparatus.

2. Apparatus according to claim 1, characterized in that said heat exchange material comprises at least one passage connecting the two passageways (17, 18) and adapted to be traversed alternately in opposite directions by the two fluids.

3. Apparatus according to claim 2, characterized in that said passage comprises over at least a portion (23) of its length a packing for heat accumulation.

4. Apparatus according to claim 2, characterized in that said passage comprises over at least a portion of its length a packing that selectively adsorbs certain constituents of one of the fluids.

5. Apparatus according to claim 3, characterized in that each packing is arranged in an annular bed (23).

6. Apparatus according to claim 3, characterized in that the packing or at least one packing is constituted by particles having an average diameter less than 15 mm and preferably comprised between 1 and 10 mm.

7. Apparatus according to claim 1, characterized in that it constitutes a thermal regenerator.

8. Apparatus according to claim 1, characterized in that it is adapted to cool atmospheric air to be distilled, by recovery of the cold contained in a current of fluid from an air distillation apparatus (4).

9. Apparatus according to claim 8, characterized in that it is adapted moreover to purify from water and $CO_2$ the air in the course of cooling.

10. Apparatus according to claim 9, characterized in that it comprises an external annular bed for the adsorption of water and $CO_2$ contained in the air to be treated.

11. Installation for the distillation of air, comprising air compression means (1), means (3) for cooling and purifying air, and an air distillation apparatus (4) supplied with cooled and purified air, characterized in that the cooling and purification means comprise at least one heat exchange apparatus (3) according to claim 1, whose radially external passageway (17) is for the inlet of air to be distilled and whose radially internal passageway (18) is for the inlet of a fluid from the air distillation apparatus (4).

12. Process for cryogenic cooling of a first fluid available at about ambient temperature, by countercurrent heat exchange with a second fluid available at a cryogenic temperature below $20°$ C., which comprises alternately circulating the first fluid in a heat exchange apparatus (3) that comprises a vessel containing heat exchange material and that has a radially external passageway and a radially internal passageway, in an overall centrifugal manner relative to a general central axis (X-X) of this apparatus, from said radially external passageway (17) of the apparatus through said heat exchange material and out said radially external passageway, and circulating the second fluid in a generally centrifugal manner relative to said central axis, from said radially internal passageway (18) through said heat exchange material and out said radially external passageway of the apparatus.

13. Process according to claim 12, characterized in that the fluids pass alternatingly in opposite directions through a passage of the apparatus (3) connecting said inlets (17, 18).

14. The process according to claim 13, characterized in that said passage comprises over at least a portion (23) of its length a packing for heat accumulation.

15. Process according to claim 14, characterized in that the packing or each packing is arranged in an annular bed (23).

16. Process according to claim 15, characterized in that the circulation of the first fluid is stopped when there is, in the annular bed, an external annular layer (26B) of predetermined thickness at about ambient temperature, and the circulation of the second fluid is stopped when there is, in the annular bed, an internal annular layer (25A) of predetermined thickness at about the cryogenic temperature.

17. Process according to claim 13, characterized in that said passage comprises over at least a portion of its length a packing for selective adsorption of certain constituents of one of the fluids.

18. Process according to claim 12, characterized in that the first fluid is atmospheric air to be distilled and the second fluid is a current of fluid from an air distillation apparatus (4).

19. Process according to claim 18, characterized in that, immediately before said cooling of the air, there is carried out an at least partial purification of this air from $CO_2$ and water.

20. Process according to claim 19, characterized in that the purification comprises only a partial stopping of the water vapor.

* * * * *